United States Patent
Enoki et al.

(10) Patent No.: US 9,248,766 B2
(45) Date of Patent: Feb. 2, 2016

(54) HEADREST STAY AND ACTIVE HEADREST

(75) Inventors: Koichi Enoki, Susono (JP); Masahide Sawada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 192 days.

(21) Appl. No.: 13/504,328

(22) PCT Filed: Oct. 29, 2009

(86) PCT No.: PCT/JP2009/005757
§ 371 (c)(1),
(2), (4) Date: Apr. 26, 2012

(87) PCT Pub. No.: WO2011/052014
PCT Pub. Date: May 5, 2011

(65) Prior Publication Data
US 2012/0217783 A1     Aug. 30, 2012

(51) Int. Cl.
*B60N 2/48*     (2006.01)
(52) U.S. Cl.
CPC ............ *B60N 2/4817* (2013.01); *B60N 2/4885* (2013.01)
(58) Field of Classification Search
CPC ...... B60N 2/48; B60N 2/4802; B60N 2/4805; B60N 2/4817; B60N 2/4885
USPC ..................... 297/410, 391, 216.12, 404, 409
See application file for complete search history.

(56) References Cited

U.S. PATENT DOCUMENTS

| | | | | |
|---|---|---|---|---|
| 2,756,808 A | * | 7/1956 | Eichorst | 297/230.11 |
| 5,181,763 A | * | 1/1993 | Dellanno et al. | 297/391 |
| 6,019,424 A | * | 2/2000 | Ruckert et al. | 297/216.12 |
| 6,199,947 B1 | * | 3/2001 | Wiklund | 297/216.12 |
| 6,511,130 B2 | * | 1/2003 | Dinkel et al. | 297/410 |
| 6,604,788 B1 | * | 8/2003 | Humer | 297/216.13 |
| 6,631,949 B2 | * | 10/2003 | Humer et al. | 297/216.12 |
| 6,631,955 B2 | * | 10/2003 | Humer et al. | 297/408 |

(Continued)

FOREIGN PATENT DOCUMENTS

| | | |
|---|---|---|
| DE | 94 00 352 U1 | 4/1994 |
| DE | 10 2006 015 786 A1 | 10/2006 |

(Continued)

OTHER PUBLICATIONS

Decision of a Patent Grant dated Jul. 19, 2013, issued in Japanese Application No. 2011-538119 (w/English translation).

(Continued)

*Primary Examiner* — Philip Gabler
(74) *Attorney, Agent, or Firm* — Oblon, McClelland, Maier & Neustadt, L.L.P.

(57) ABSTRACT

A headrest stay includes a pair of first stay-composing parts extending in top and bottom directions of a seat back while supported by the seat back, the first stay-composing parts being arranged in different positions in a direction of vehicle width; and a second stay-composing part connecting specific parts of the first stay-composing parts in the direction of the vehicle width, the specific parts extending straight in the top and bottom directions of the seat back. The specific parts face a head of an occupant seated on the seat. A portion of the second stay-composing part, which portion is between the one specific part and the other specific part in the direction of the vehicle width, is not located further forward than the specific parts, and at least part of the portion is located further rearward than the specific parts.

6 Claims, 7 Drawing Sheets

(56) References Cited

U.S. PATENT DOCUMENTS

| | | | |
|---|---|---|---|
| 6,655,733 B2 * | 12/2003 | Humer et al. | 297/216.12 |
| 6,719,368 B1 * | 4/2004 | Neale | 297/216.14 |
| 6,749,256 B1 * | 6/2004 | Klier et al. | 297/216.12 |
| 6,789,846 B2 * | 9/2004 | Humer et al. | 297/216.12 |
| 7,017,989 B2 * | 3/2006 | Yamaguchi et al. | 297/216.12 |
| 7,044,544 B2 * | 5/2006 | Humer et al. | 297/216.12 |
| 7,284,794 B2 * | 10/2007 | Yamaguchi et al. | 297/216.12 |
| 7,530,633 B2 * | 5/2009 | Yokota et al. | 297/216.12 |
| 7,540,562 B2 * | 6/2009 | Sekida | 297/216.12 |
| 7,621,598 B2 * | 11/2009 | Humer et al. | 297/410 |
| 7,758,114 B2 * | 7/2010 | Yokota et al. | 297/216.12 |
| 2006/0238010 A1 | 10/2006 | Yetukuri et al. | |
| 2007/0246979 A1 * | 10/2007 | Browne et al. | 297/216.12 |
| 2008/0088158 A1 * | 4/2008 | Yokota et al. | 297/216.12 |
| 2008/0284225 A1 * | 11/2008 | Gauthier et al. | 297/404 |
| 2009/0021060 A1 * | 1/2009 | Ishijima et al. | 297/216.12 |
| 2009/0102255 A1 * | 4/2009 | D'Agostini et al. | 297/216.12 |
| 2010/0156161 A1 * | 6/2010 | LaPointe et al. | 297/409 |
| 2013/0175393 A1 * | 7/2013 | Udriste et al. | 244/122 R |

FOREIGN PATENT DOCUMENTS

| | | |
|---|---|---|
| EP | 0 662 404 A1 | 7/1995 |
| JP | 8 389 | 1/1996 |
| JP | 2000 203322 | 7/2000 |
| JP | 2000 270958 | 10/2000 |
| JP | 2001 191886 | 7/2001 |
| JP | 2001 333832 | 12/2001 |
| JP | 2004 57503 | 2/2004 |
| JP | 2005 206016 | 8/2005 |
| JP | 2005 287765 | 10/2005 |
| JP | 2006 69286 | 3/2006 |
| JP | 2008 206683 | 9/2008 |
| JP | 2009 23425 | 2/2009 |
| JP | 2009-179140 | 8/2009 |

OTHER PUBLICATIONS

German Office Action issued Apr. 29, 2013, in German Patent Application No. 11 2009 005 335.1 (English translation only).

International Search Report Issued Nov. 24, 2009 in PCT/JP09/05757 Filed Oct. 29, 2009.

International Preliminary Report on Patentability Issued Feb. 7, 2012 in PCT/JP09/05757 Filed Oct. 29, 2009.

* cited by examiner

HEADREST STAY AND ACTIVE HEADREST

FIELD

The present invention relates to a headrest stay and an active headrest. In particular, the present invention relates to a headrest stay and an active headrest that are used for a vehicle.

BACKGROUND

Conventionally, a headrest stay is known, which is supported by a seat back and to which the body of a headrest is fixed. For example, Patent Literature 1 discloses the technique for embedding the curved parts of a stay bent substantially in an inverted U shape into the pillow-like pad of a headrest.

CITATION LIST

Patent Literature

Patent Literature 1: Japanese Patent Application Laid-open No. 8-389

SUMMARY

Technical Problem

In the case of a stay having a pair of members extending in top and bottom directions of a seat back and a member connecting the pair of members in the direction of vehicle width, as in the case of a stay bent in an inverted U-shape, there is a possibility that a member in the direction of vehicle width may restrict movement of an occupant's head. For example, in the event that another vehicle collides with the vehicle from behind and an occupant's head is consequently supported by a headrest, movement of the head in the top and bottom directions of the seat back may be restricted by a member extending in the direction of vehicle width. Accordingly, there has come to be a demand for a headrest stay that enables smoother movement of the head in the top and bottom directions of a seat back.

The object of the present invention is to provide a headrest stay and an active headrest that are able to restrain restriction of movement of a head in the top and bottom directions of a seat back.

Solution to Problem

A headrest stay according to the present invention includes a pair of first stay-composing parts extending in top and bottom directions of a seat back of a seat provided in a vehicle, while supported by the seat back, the first stay-composing parts being arranged in different positions in a direction of vehicle width; and a second stay-composing part connecting specific parts of the first stay-composing parts in the direction of the vehicle width, the specific parts extending straight in the top and bottom directions of the seat back; wherein the specific parts face a head of an occupant seated on the seat and a space between the one specific part and the other specific part in the direction of the vehicle width is less than a width of the head of the seated occupant in the direction of the vehicle width, the second stay-composing part does not have a portion located further forward than foremost portions of the first stay-composing parts, and a portion of the second stay-composing part, which portion is between the one specific part and the other specific part in the direction of the vehicle width, is not located further forward than the specific parts, and at least part of the portion is located further rearward than the specific parts and, on a line extending in the top and bottom directions from the front end of each of the specific parts as viewed from the side, includes no member connecting the one specific part and the other specific part in the direction of the vehicle width.

In the headrest stay, in the second stay-composing part, it is preferable that the entire portion between the one specific part and the other specific part in the direction of the vehicle width is located further rearward than the specific parts.

In the headrest stay, it is preferable to further include a plate-like member connecting the one specific part and the other specific part in the direction of the vehicle width and disposed parallel to a plane defined by the one specific part and the other specific part.

An active headrest according to the present invention includes a headrest stay; a cover covering the headrest stay; and a moving mechanism configured to move the headrest stay closer to the seated occupant.

In the active headrest, it is preferable that the moving mechanism is actuated in response to mechanical input and moves the headrest stay at least forward, and an amount that an upper part of the headrest stay in the top and bottom directions is moved forward by the moving mechanism is preferably larger than an amount that a lower part thereof is moved forward by the moving mechanism.

Advantageous Effects of Invention

A headrest stay according to the present invention includes a pair of first stay-composing parts extending in the top and bottom directions of a seat back, and a second stay-composing part connecting the specific parts of the corresponding first stay-composing parts in the direction of vehicle width, the specific parts extending straight in the top and bottom directions of the seat back. The specific parts face the head of an occupant seated on a seat. A portion of the second stay-composing part, which portion is between the one specific part and the other specific part in the direction of vehicle width, is not located further forward than the specific parts, and at least part of this portion is located further rearward than the specific parts and, on a line extending in the top and bottom directions from the front end of each of the specific parts as viewed from the side, includes no member connecting the one specific part and the other specific part in the direction of the vehicle width. This yields the effect that the head of a seated occupant is restrained from being caught by the second stay-composing part and hence restriction of movement of the head in the top and bottom directions of the seat back is eased.

DESCRIPTION OF EMBODIMENTS

A headrest stay according to one embodiment of the present invention will be described below with reference to the drawings. It should be understood that the present invention is not limited to this embodiment. It should also be understood that the compositional elements in the embodiment described below include ones that could easily be anticipated by those skilled in the art and ones that are substantially identical to the compositional elements.

First Embodiment

Figure 1:
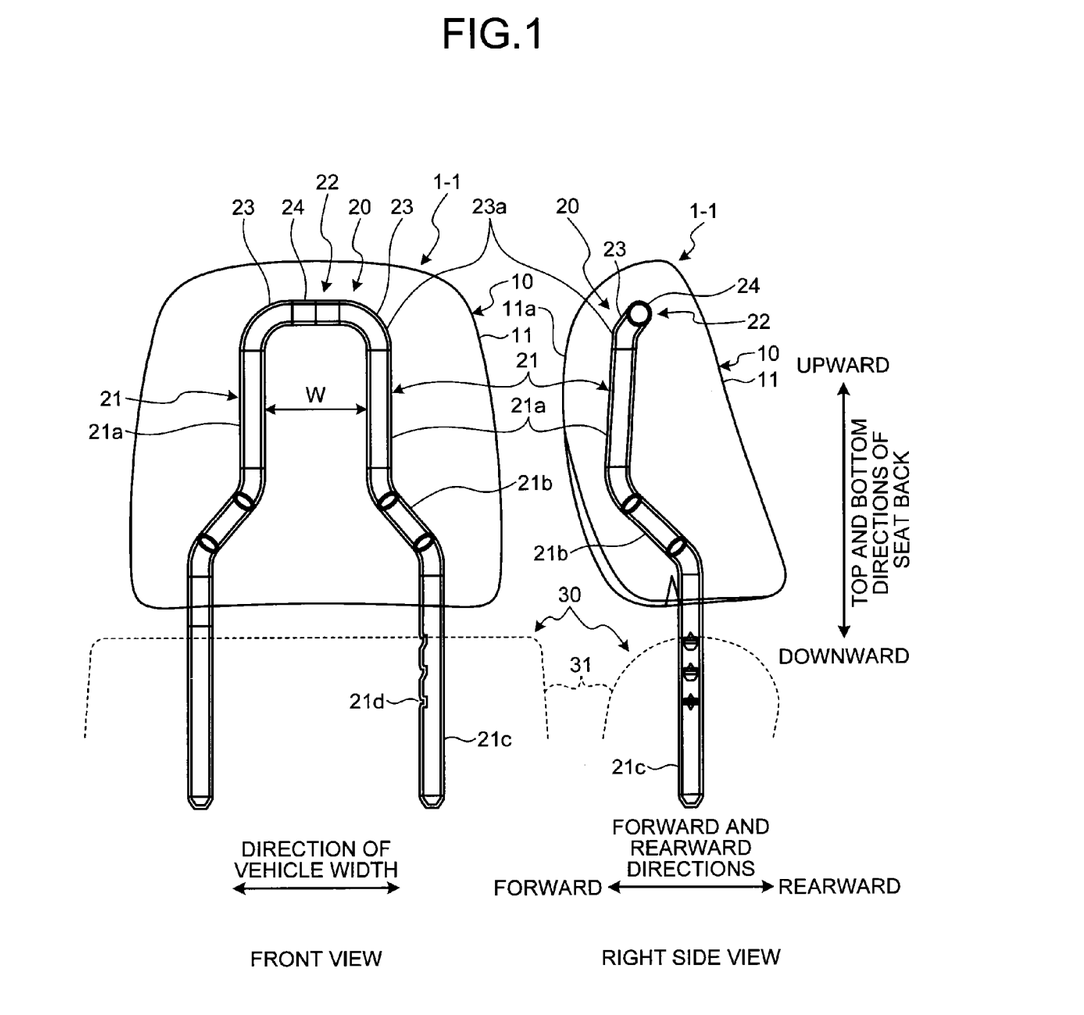
FIG. 1 is a diagram illustrating a headrest stay according to one embodiment of the present invention.

FIG. 1 shows a front view and a side view of the headrest stay according to one embodiment of the present invention. As shown in FIG. 1, a headrest 1-1 according to the present embodiment includes a body 10 and a stay (headrest stay) 20. The body 10 has a hollow case (cover) 11. The stay 20 is composed of a pipe-like, or solid rod-like, member. The stay 20 has a substantially U-shaped form, and the stay 20 is disposed such that both ends of the letter U are located on the lower side. The stay 20 has: a pair of first stay-composing parts 21, 21 extending in the top and bottom directions of a seat back 31 while supported by the seat back 31 of a seat 30 in a vehicle not shown (hereinafter simply referred to as "the top and bottom directions of the seat back") and arranged in different positions in the direction of vehicle width so as to be parallel to each other; and a second stay-composing part 22 connecting, in the direction of vehicle width, the portions (specific parts 21a, described below) of the corresponding first stay-composing parts 21, which portions extend straight in the top and bottom directions of the seat back.

Each first stay-composing part 21 includes: a fixed part 21c provided lowest in the top and bottom directions of the seat back, a specific part 21a provided highest in the top and bottom directions of the seat back, and a connection part 21b connecting the fixed part 21c and specific part 21a. Each fixed part 21c extends in the top and bottom directions of the seat back and is supported by the seat back 31. The fixed part 21c has engagement grooves 21d. While the fixed parts 21c are kept inserted in the seat back 31, engagement projections (not shown) provided on the seat back 31 side engage with these engagement grooves 21d, thereby positioning the fixed parts 21c.

Each specific part 21a extends straight in the top and bottom directions of the seat back. In the present embodiment, the specific parts 21a on both sides in the direction of the vehicle width are provided parallel to each other. The specific parts 21a, 21a face the head of an occupant seated on the seat 30. "The specific parts 21a, 21a face the head of an occupant" means that, for example, it is assumed at a design stage that the specific parts 21a, 21a face the head of a seated occupant. Depending on the body type, posture, or the like, of a seated occupant, there may be a case where the specific parts 21a, 21a and the head of a seated occupant are not parallel with each other. The space W between the one specific part 21a and the other specific part 21a is less than the width of the head of a seated occupant in the direction of vehicle width. The distance between these connection parts 21b, 21b decreases from the fixed parts 21c toward the specific parts 21a and the connection parts 21b, 21b are inclined forward.

The second stay-composing part 22 includes bent parts 23 and a straight part 24. The bent parts 23 are connected to both corresponding ends of the straight part 24, and the end of each bent part 23, which is opposite to the end connected to the straight part 24, is connected to the specific part 21a of the corresponding first stay-composing part 21. Each bent part 23 is inclined rearward toward a higher position in the top and bottom directions of the seat back from the end 23a connected to the corresponding specific part 21a, is then bent in the direction of vehicle width, and is connected to the straight part 24. As described above, the second stay-composing part 22 connects the respective specific parts 21a of the first stay-composing parts 21 in the direction of vehicle width.

In the stay 20, the specific parts 21a and connection parts 21b of the first stay-composing parts 21 and the second stay-composing part 22 are arranged within the case (cover) 11. The case 11 is filled with resin foam, and the body 10 and the stay 20 are thereby fixed. In the forward and rearward directions, the specific parts 21a face a support part 11a of the case 11, which supports the head of a seated occupant. Specifically, of the first stay-composing parts 21, the specific parts 21a are portions located within the case 11, extending straight in the top and bottom directions of the seat back, and able to support the head of a seated occupant via the support part 11a.

Figure 7:
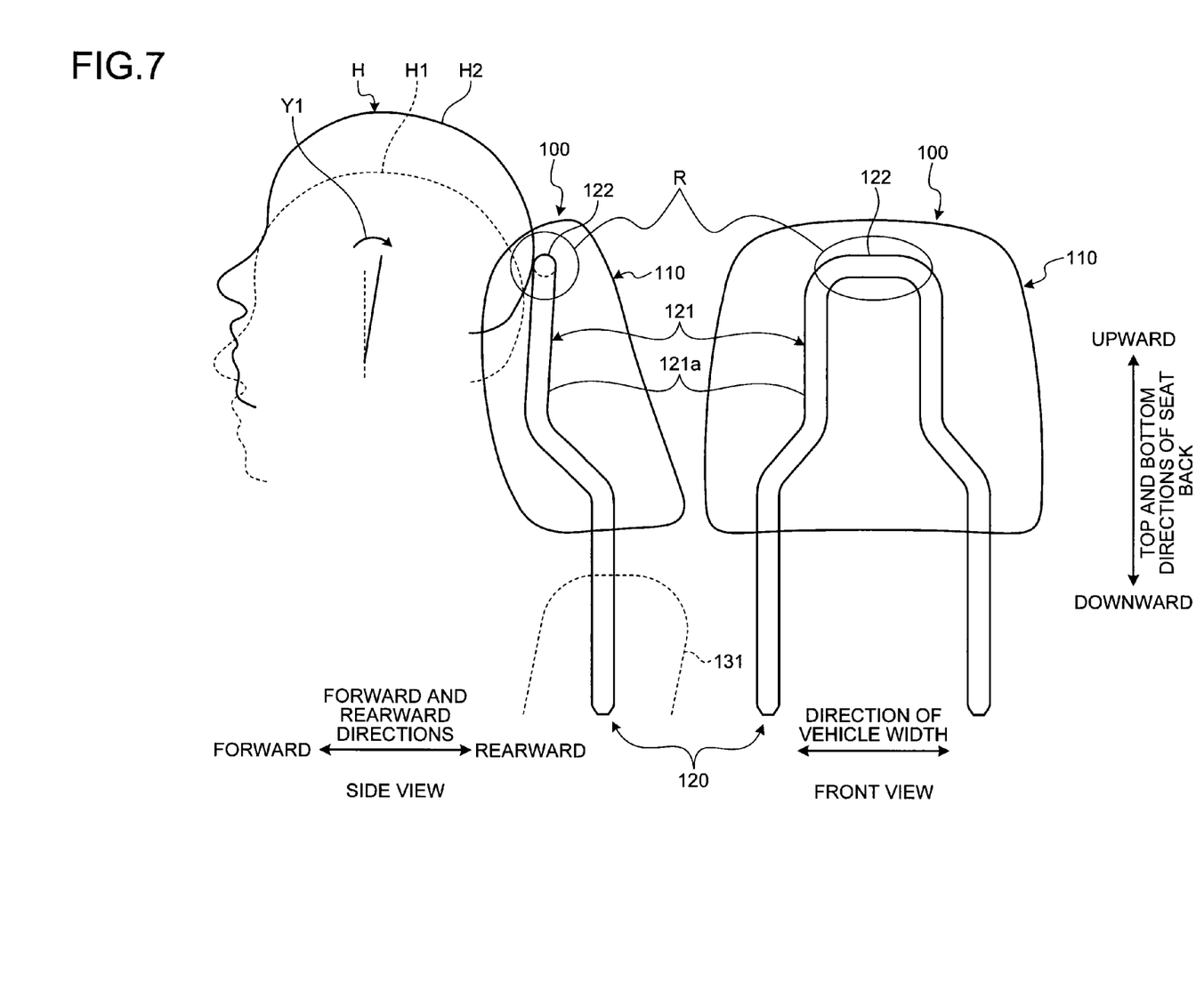
FIG. 7 is a diagram of an example of a headrest that has a conventional stay.

In the stay 20 according to the present embodiment, the second stay-composing part 22, which is the upper end of the stay 20, bends away from the specific parts 21a rearwards. Accordingly, as described below, restriction of movement of the head of a seated occupant is eased. First, a description is given of the problem with a conventional headrest, which is that movement of a seated occupant is restricted. FIG. 7 is a diagram of an example of a headrest that has a conventional stay.

In FIG. 7, a symbol 100 represents a headrest. A stay 120 of the headrest 100 includes: a pair of first stay-composing parts 121 extending in the top and bottom directions of a seat back and arranged in different positions in vehicle width direction; and a second stay-composing part 122 connecting in the vehicle width direction a specific parts 121a of the pair of first stay-composing parts 121, which specific parts 121a extend straight in the top and bottom directions of the seat back. The position of the second stay-composing part 122 in the forward and rearward directions is the same as the positions of the specific parts 121a. As viewed from the side, the second stay-composing part 122 overlaps the specific parts 121a (i.e., it is located on the same line as they are).

If forward acceleration is exerted on the vehicle, as in the event where another car collides with the vehicle from behind, the head H of a seated occupant may be moved rearwards and pressed against a body 110 of the headrest 100. Additionally, rearward inertia may be exerted on the seat and, moreover, the seated position of the occupant may be shifted downwards, with the result that a seat back 131 may tilt obliquely downward (rearwards). Consequently, the seated occupant may try to move toward a higher position in the top and bottom directions of the seat back relative to the seat back 131 and the headrest 100. The head H of the seated occupant may be moved toward a higher position along the specific parts 121a while pressed against the body 110 and supported by the specific parts 121a. In this case, the second stay-composing part 122 is located on the same plane as the pair of specific parts 121a, 121a. Therefore, near the upper end of the stay 120, indicated by a symbol R, the head H of the seated occupant may be caught by the body 110. Consequently, the head H may be turned around an axis in the direction of vehicle width, as shown by arrow Y1, through the portion of the head H caught by the body 110, which is the center of rotation. A symbol H1 indicates the head H before the turn and a symbol H2 indicates the head H after the turn. Accordingly, because movement of the head H of the seated occupant is restricted in the top and bottom directions of the seat back, the seated occupant may feel discomfort, such as his/her head H turning, as described above.

Figure 2:
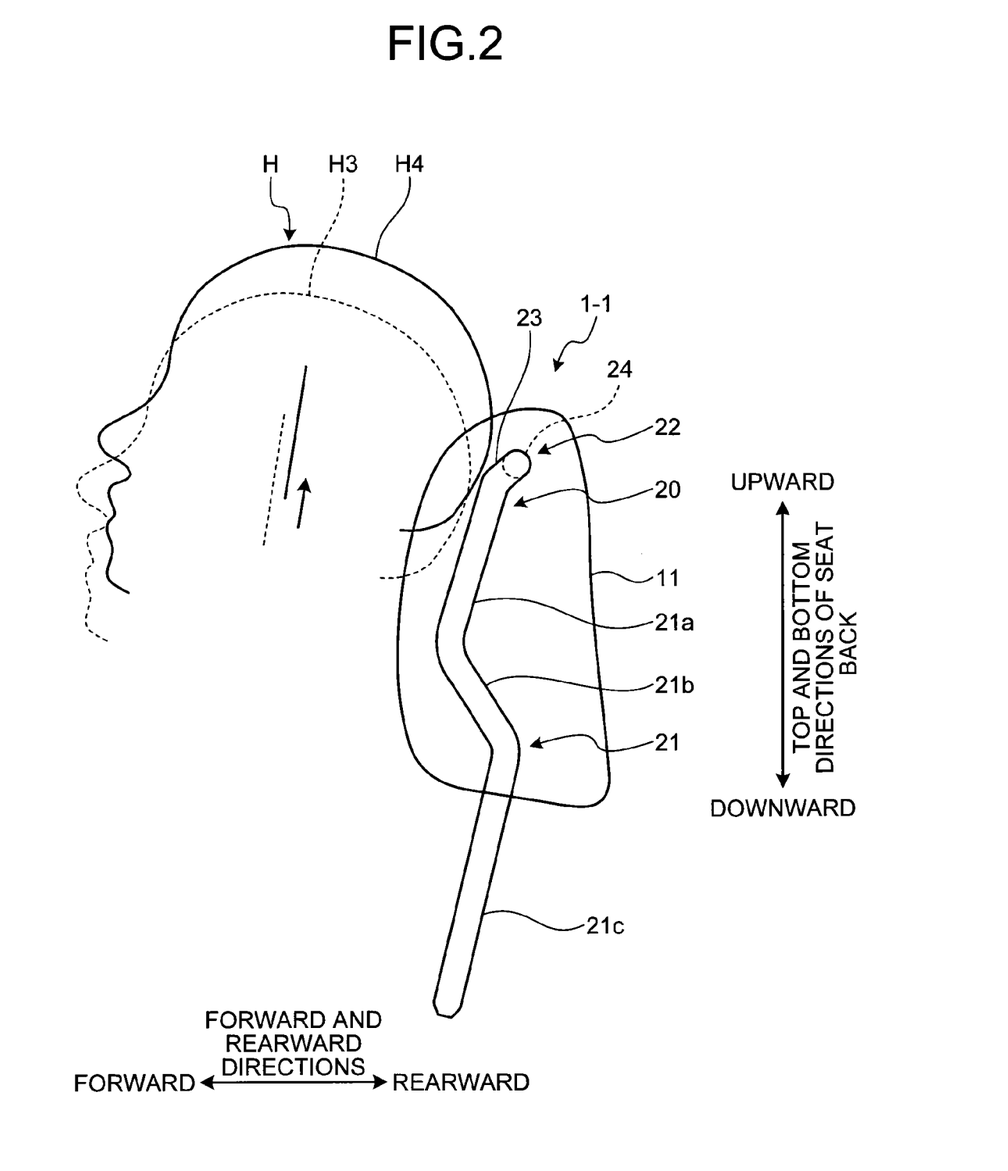
FIG. 2 is a diagram illustrating how the head of a seated passenger moves.

In contrast, in the stay 20 according to the present embodiment, the second stay-composing part 22 does not have a portion further forward than the foremost portions of the first stay-composing parts 21. In the second stay-composing part 22, the portion between one specific part 21a and the other specific part 21a in the direction of vehicle width is not located further forward than the specific parts 21a. In addition, at least part of the second stay-composing part 22 is located further rearward than the specific parts 21a. Accordingly, as illustrated in FIG. 2 for reference, restriction of movement of the head H of a seated occupant is eased when the head H of the seated occupant is moved in the top and bottom directions of the seat back. If forward acceleration is exerted on the vehicle, the head H of a seated occupant is moved in a higher position in the top and bottom directions of the seat back relative to the headrest 1-1. FIG. 2 illustrates how the head of a seated occupant on a headrest that has the stay of the present embodiment moves. In FIG. 2, a symbol H3 indicates the head H before movement and a symbol H4 indicates the head H after movement. In the second stay-composing part 22, at least part of the portion (the portion including a straight part 24) located between the specific parts 21a, 21a in the direction of the vehicle width is located further rearward than the specific parts 21a (i.e., on the side opposite to the seated occupant's side). Accordingly, the head H is restrained from being caught when moved in the top and bottom directions in the seat back while in contact with the body 10 (case 11).

Particularly, in the present embodiment, the straight part 24 of the second stay-composing part 22 is connected to the specific parts 21a via the bent parts 23 tilting in a direction opposite to the seated occupant's side from the corresponding specific parts 21a. Thereby, in the second stay-composing part 22, the entire portion between the one specific part 21a and the other specific part 21a in the direction of the vehicle width is located on the side opposite to the seated occupant's side (i.e., rearwards) with respect to the specific parts 21a. Accordingly, the head H of a seated occupant is effectively restrained from being caught when moved in the top and bottom directions of the seat back. This makes it possible to smoothly move the head H in the upward and rearward directions of the seat back. Since the head H of a seated occupant is restrained from being caught, the head H is prevented from being turned around an axis in the direction of vehicle width, as explained below with reference to FIG. 3.

Figure 3:
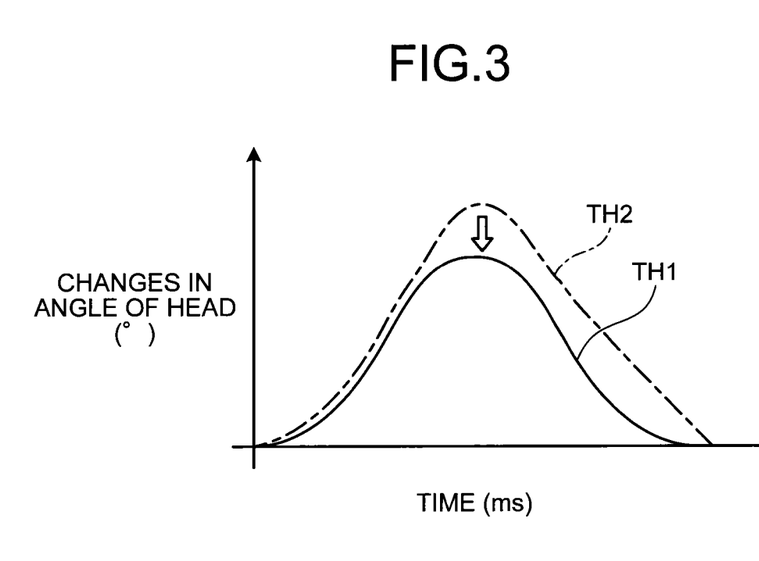
FIG. 3 is a diagram illustrating the angles through which the head H of a seated occupant is inclined rearward in the event where another vehicle collides with the vehicle from behind.

FIG. 3 is a diagram illustrating the angles through which the head H of a seated occupant is inclined rearward in the event where another vehicle collides with the vehicle from behind. In FIG. 3, the horizontal axis indicates time elapsed since the collision from behind, and the vertical axis indicates changes in the angle of the head H of the seated occupant when the head H is inclined in the forward and rearward directions. A symbol TH1 indicates changes in the angle of the head H when the headrest 1-1 according to the present embodiment is used, and a symbol TH2 indicates changes in the angle of the head H when a conventional headrest 100 as shown in FIG. 7 is used.

As shown in FIG. 3, the degree of change TH1 in the angle of the head H when the headrest 1-1 according to the present embodiment is used is less than that of change TH2 in the angle of the head H when a conventional headrest 100 is used.

That is, with the headrest 1-1 according to the present embodiment, the head H is restrained from being caught when moved in the top and bottom directions of the seat back.

In the present embodiment, in the second stay-composing part 22, the entire portion between the one specific part 21a and the other specific part 21a in the direction of vehicle width is located on the side opposite to the seated occupant's side with respect to the specific parts 21a. However, the present invention is not limited to this. In the second stay-composing part 22, it is enough for at least part of the portion between the one specific part 21a and the other specific part 21a in the direction of vehicle width to be located on the side opposite to the seated occupant's side with respect to the specific parts 21a; it is preferable that a portion in the intermediate part between the specific parts 21a, 21a in the direction of vehicle width be located on the side opposite to the seated occupant's side with respect to the specific parts 21a.

Additionally, in the present embodiment, the second stay-composing part 22 connects the respective upper ends of the specific parts 21a, 21a in the top and bottom directions of the seat back. However, the present invention is not limited to this. The second stay-composing part 22 may connect other portions of the specific parts 21a, 21a, instead of the upper ends.

Second Embodiment

Figure 4:
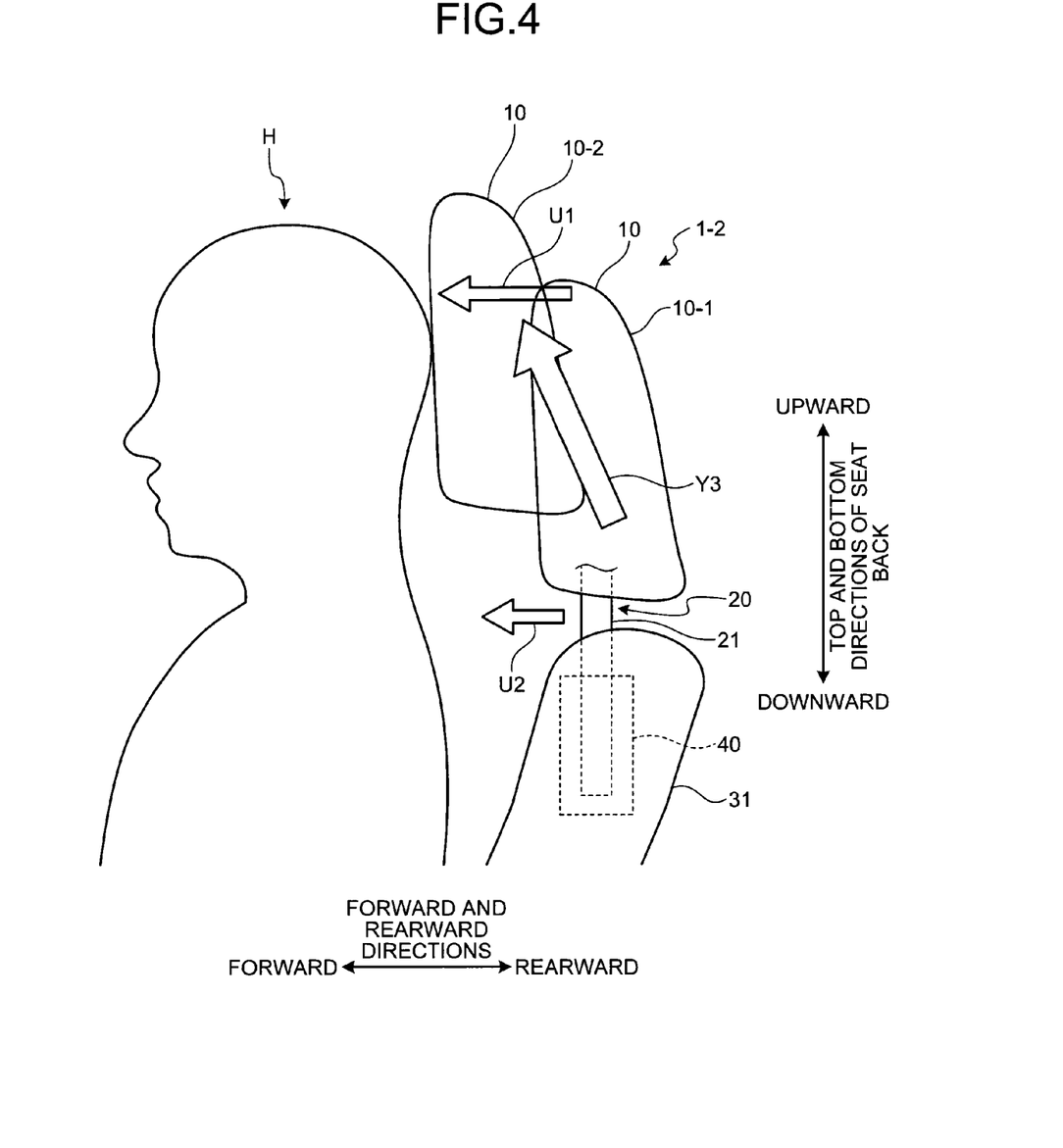
FIG. 4 is a diagram illustrating an example of the movement of the headrest according to the present embodiment.

A second embodiment will be described with reference to FIG. 4. FIG. 4 is a diagram illustrating an example of the movement of the headrest according to the present embodiment. The second embodiment will be described only in respects different from the first embodiment.

A headrest 1-2 according to the present embodiment is configured as an active headrest that moves a stay in the direction in which the space between a body and a head H of a seated occupant decreases, for example, in the event where another vehicle collides with the vehicle.

The headrest 1-2 includes: a stay 20 and a body 10, which are the same as those in the first embodiment, and also an active unit (moving mechanism) 40 that moves the stay 20 and the body 10 closer to the head H of a seated occupant. The active unit 40 may be a mechanism that is actuated in response to a mechanical input caused by a seated occupant's being pressed against a seat back 31 as a result of another vehicle's having collided with the vehicle, and consequently moves the stay 20 and the body 10. A trigger (actuating mechanism) that mechanically inputs the active unit 40 is not limited to one that initiates actuation in conjunction with movement of a seated occupant.

For example, a trigger may be one that is able to mechanically input the active unit 40 in response to impact, pressure, acceleration, or the like, caused by another vehicle's colliding with the vehicle, and that may initiate actuation mechanically or under control. Alternatively, the trigger may be one that mechanically inputs the active unit 40 in the event collision is predicted based on, for example, a detection result obtained by a means for detecting a vehicle approaching the vehicle conveying the occupant.

When the trigger is not actuated, the body 10 and the stay 20 are stopped in a position (refer to a symbol 10-1) that may be apart from the head H of a seated occupant within a movable range. Upon actuation of the trigger, the body 10 is moved closer to the head H together with the stay 20 by the active unit 40 (refer to arrow Y3). A symbol 10-2 indicates the body 10 moved toward the head H by the active unit 40. The direction in which the body 10 and the stay 20 are moved at this time is, for example, forward and toward a higher position in the top and bottom directions of the seat back. Thereby, the space between the head H of a seated occupant and the body 10 and hence the amount of rearward movement of the head H decrease. The direction in which the body 10 is moved by the active unit 40 is not limited to this. For example, the direction in which the body 10 is moved by it may be forward only.

In addition, in the headrest 1-2, the second stay-composing part 22 is identical in configuration to that of the stay 20 of the first embodiment. Accordingly, when the head H of a seated occupant is moved in top and bottom directions of the seat back after having contacted the body 10, the headrest 1-2 yields the advantageous effect that restriction of movement of the head H is eased, as in the first embodiment described above. Since the headrest 1-2 is configured as an active headrest, the time for which the seated occupant's head H is supported by the body 10 may be long, as in the event where another vehicle collides with the occupant's vehicle from behind. In this case, the stay 20 that eases restriction of the movement of head H in the top and bottom directions of the seat back can exhibit the effect more efficiently in combination with the active headrest. In order to ease restriction of movement of the head H in the top and bottom directions of the seat back, it is preferable that the body 10 does not incorporate any compositional elements of an airbag or the like.

Additionally, the stay 20, configured as in the first embodiment described above and having a second stay-composing part 22 at least part of which is located further rearward than the specific parts 21a, is effective particularly when the active unit 40 moves the stay 20 at least forwards, and the amount that the upper part of the stay 20 in the top and bottom directions of the seat back is moved forwards by the active unit 40 (refer to a symbol U1 in FIG. 4) is large, compared to the amount that the lower part of the stay 20 is moved forwards by the active unit 40 (refer to a symbol U2 in FIG. 4). Where the active unit 40 moves the stay 20 in such a manner (e.g., the upper part of the stay 20 is turned further forwards than the lower part), there is a possibility that the head H moved in top and bottom directions of the seat back may be caught by the second stay-composing part 22. However, the stay 20 in which the second stay-composing part 22 is disposed away from the specific parts 21a eases restriction of movement of the head H in the top and bottom directions of the seat back even when the stay 20 is moved forward by the active unit 40.

Third Embodiment

A third embodiment will be described. In the third embodiment, only respects different from the embodiments described above will be described.

Figure 5:
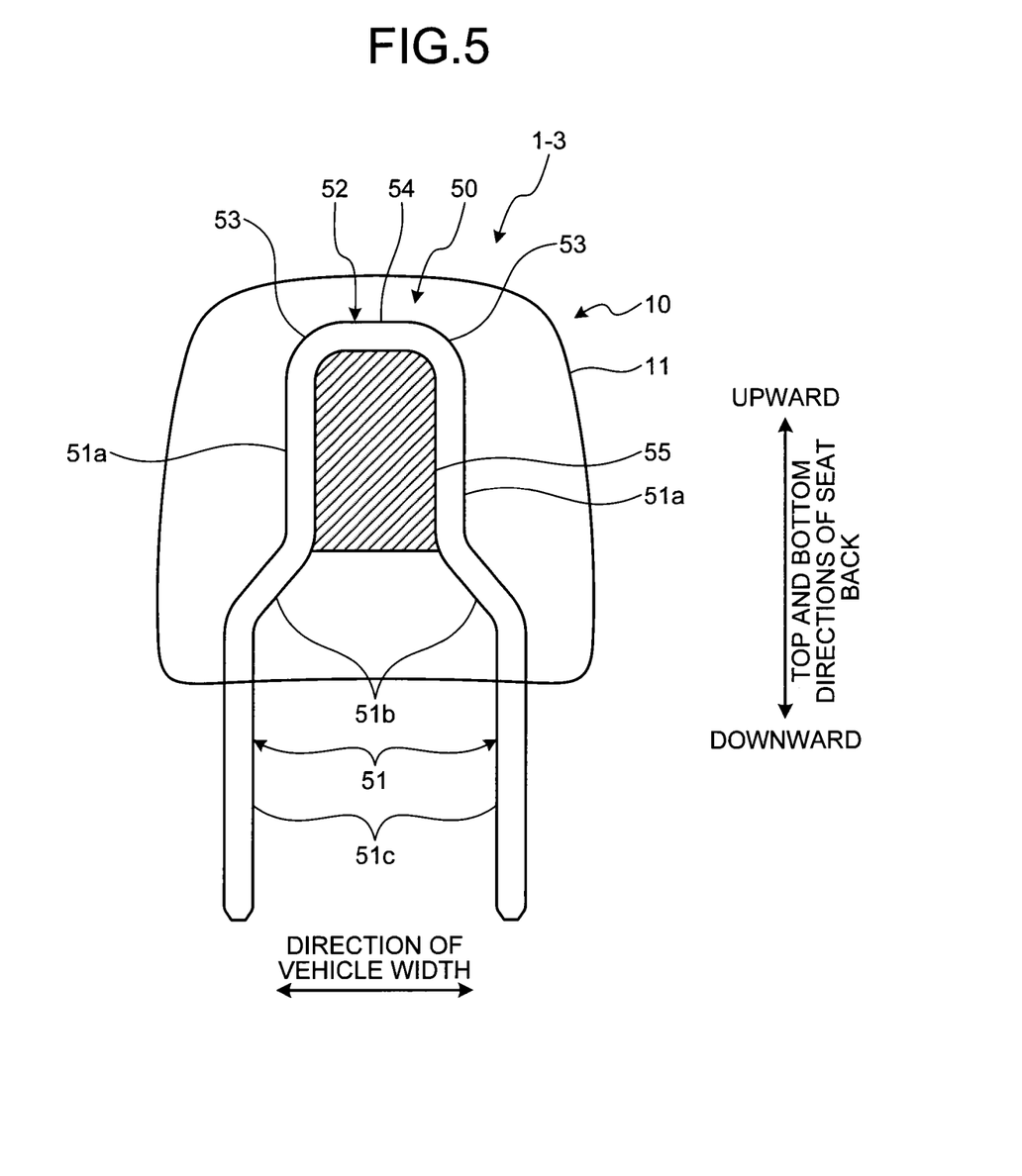
FIG. 5 is a diagram schematically illustrating the configuration of the headrest according to the present embodiment.

A stay 50 of a headrest 1-3 according to the present embodiment has, in addition to the configuration of the stay 20 of each embodiment described above, the configuration for easing restriction of movement of the head H of a seated occupant in the top and bottom directions of the seat back. FIG. 5 is a diagram schematically illustrating the configuration of the headrest 1-3 according to the present embodiment.

In FIG. 5, a symbol 50 represents a stay; 51, first stay-composing parts; 52, a second stay-composing part; 53, bent parts; 54, a straight part; 51a, specific parts; 51b, connection parts; and 51c, fixed parts. As in the stay 20 in each embodiment described above, the stay 50 does not have a portion further forward than the foremost portions of the first stay-composing parts 51. Also, the portion of the second stay-composing part 52, which portion is between the specific parts 51a, 51a in the direction of vehicle width, is not located further forward than the specific parts 51a, and at least part of this portion is located further rearward than the specific parts 51a. Further, a plate-like member 55 is provided between the specific parts 51a, 51a.

The plate-like member 55 is made of metal or resin or the like and connects the one specific part 51a and the other specific part 51a in the direction of vehicle width. The plate-like member 55 is disposed parallel to a plane defined by the specific parts 51a, 51a and is able to support the head H of a seated occupant. By virtue of the plate-like member 55, the head H of a seated occupant is supported by the plate-like member 55 when the head H is moved rearward and pressed against a body 10. Thereby, when the head H is moved in the top and bottom directions of the seat back relative to the headrest 1-3, the head H can be moved while supported by the plate-like member 55. Accordingly, rearward movement of the head H is restrained, unlike the case where no plate-like member 55 is provided and the head H is moved while supported by the specific parts 51a. As a result, the head H is restrained from being caught by the body 10 (the second stay-composing part 52). Additionally, in the present embodiment, the plate-like member 55 extends up to the second stay-composing part 52, towards a higher part of the seat back. The upper end of the plate-like member 55 is connected to the second stay-composing part 52. Accordingly, restriction of movement of the head H of a seated occupant in the top and bottom directions of the seat back is effectively eased.

Figure 6:
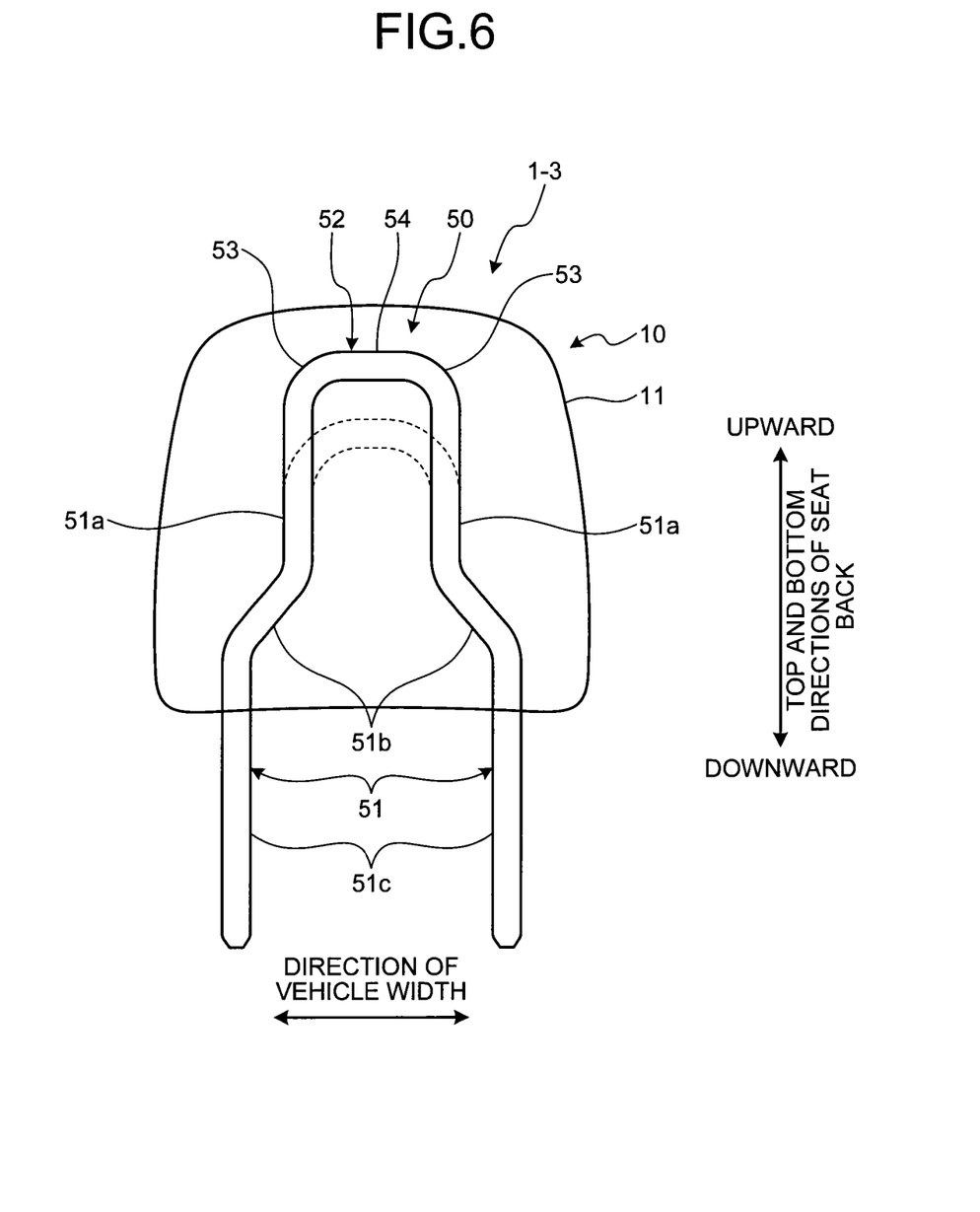
FIG. 6 is a diagram illustrating a stay extended to a higher part of a seat back.

Instead of providing the stay 50 with the plate-like member 55, or in addition to the provision of the plate-like member 55, the stay 50 may be extended to a higher part of the seat back. FIG. 6 is a diagram illustrating the stay 50 extended to a higher part of the seat back.

As the stay 50 is extended to a higher part of the seat back, the second stay-composing part 52 is located in a higher position. This prevents movement of the head H in the top and bottom directions of the seat back from being restricted by the second stay-composing part 52. For example, the stay 50 can be composed such that the second stay-composing part 52 is located highest within the case 11.

It is to be understood that the embodiments described above may be used in combination with one another.

REFERENCE SIGNS LIST 1-1, 1-2, 1-3 HEADREST
10 BODY
11 CASE
20, 50 STAY
21 FIRST STAY-COMPOSING PART
21a SPECIFIC PART
21b CONNECTING PART
21c FIXED PART
22 SECOND STAY-COMPOSING PART
23 BENT PART
24 STRAIGHT PART
30 SEAT
31 SEAT BACK
H HEAD

The invention claimed is:

1. A headrest stay comprising:
a pair of first stay-composing parts extending in top and bottom directions of a seat back of a seat provided in a vehicle, while supported by the seat back, the first stay-composing parts being arranged in different positions in a direction of vehicle width; and
a second stay-composing part connecting specific parts of the first stay-composing parts in the direction of the vehicle width, the specific parts extending straight in the top and bottom directions of the seat back; wherein the specific parts face a head of an occupant seated on the seat and a space between the one specific part and the other specific part in the direction of the vehicle width is less than a width of the head of the seated occupant in the direction of the vehicle width, the second stay-composing part does not have a portion located further forward than foremost portions of the first stay-composing parts, a portion of the second stay-composing part, which portion is between the one specific part and the other specific part in the direction of the vehicle width, is not located further forward than the specific parts, and at least part of the portion is located further rearward than the specific parts and, on a line extending in the top and bottom directions from the front end of each of the specific parts as viewed from the side, includes no member connecting the one specific part and the other specific part in the direction of the vehicle width, and in the second stay-composing part, the entire portion between the one specific part and the other specific part in the direction of the vehicle width is bent rearward with a predetermined angle and located further rearward than an extended line of an extending straight line portion of the specific parts.

2. The headrest stay according to claim 1, further comprising a plate-like member connecting the one specific part and the other specific part in the direction of the vehicle width and disposed parallel to a plane defined by the one specific part and the other specific part.

3. The headrest stay according to claim 1, wherein each of the first stay-composing parts includes a fixed part which extends in the top and bottom directions of the seat back and is supported by the seat back, and a connection part which connects the fixed part and the specific part, a distance between connection parts decreasing from the fixed parts towards the specific parts, and the connection parts being inclined forward.

4. The headrest stay according to claim 3, wherein the second stay-composing part includes bent parts and a straight part, first ends of the bent part are connected to the straight part and second ends of the bent part are connected to ends of the corresponding specific parts, and the straight part is located further rearward than the extended line of the extending straight line portion of the specific parts.

5. The headrest stay according to claim 1, wherein the front end and a rear end of each of the specific parts as viewed from the side are parallel with each other.

6. The headrest stay according to claim 4, wherein the bent parts of the second stay-composing part tilt in a direction opposite to a side of the seated occupant from the corresponding specific parts.

* * * * *